United States Patent [19]

Latter

[11] 4,225,300
[45] Sep. 30, 1980

[54] RELIABLE HIGH PRESSURE APPARATUS

[75] Inventor: Richard Latter, Annandale, Va.

[73] Assignee: High Pressure Technology, Inc., Marina Del Rey, Calif.

[21] Appl. No.: 69,769

[22] Filed: Aug. 27, 1979

[51] Int. Cl.$^2$ .............................................. B30B 11/32
[52] U.S. Cl. ..................................... 425/77; 425/352; 425/446; 425/DIG. 26
[58] Field of Search ........................... 425/77, DIG. 26

[56] References Cited

U.S. PATENT DOCUMENTS

| | | | |
|---|---|---|---|
| 2,554,499 | 5/1951 | Poulter | 425/77 |
| 3,031,269 | 4/1962 | Boversperk | 425/DIG. 26 |
| 3,546,413 | 12/1970 | Ishiguka | 425/77 X |
| 3,704,969 | 12/1972 | Kennedy | 425/77 |
| 3,895,894 | 7/1975 | Bilsmann et al. | 425/77 |
| 4,118,161 | 10/1978 | Kennedy | 425/77 |

*Primary Examiner*—J. Howard Flint, Jr.
*Attorney, Agent, or Firm*—Poms, Smith, Lande & Rose

[57] ABSTRACT

An apparatus for operation in the temperature range above 1000 degrees Centigrade and at pressures above 50 kilobars, for making industrial diamonds or the like, includes arrangements for more reliably maintaining uniform temperature while compressing the charge. The high pressure cavity includes the usual insulating cylindrical liner made of a salt, or other insulating material, to facilitate the application of electricity to heat the charge, and the liner stops short of the end of the cylindrical high pressure cavity to avoid deformation as the main piston moves into the end of the high pressure cavity. A ring or rings of zinc and/or lead and/or a zinc-lead alloy, may be located immediately adjacent the end of the insulating liner, and a thin layer of lead may extend across the main piston, to insure confinement within the cavity. Heating arrangements are provided to compensate for the cooling which occurs along and at the ends of the high pressure cavity to thereby achieve more uniform temperature. Arrangements are provided for preventing the tilting of the end heating structure and for stabilizing the movement of the end heater and/or the charge as the heating and compression cycle is initiated. This is accomplished by keeping the space extending from the inner edge of the insulating liner across its opening free of zinc and/or lead which constitute the hydraulic fluid during the heating/compression cycle.

16 Claims, 10 Drawing Figures

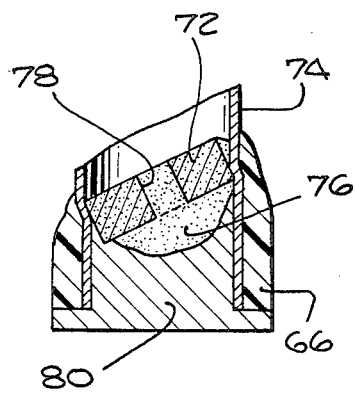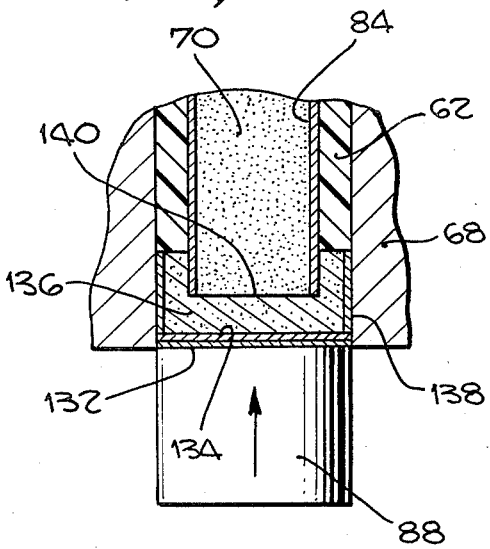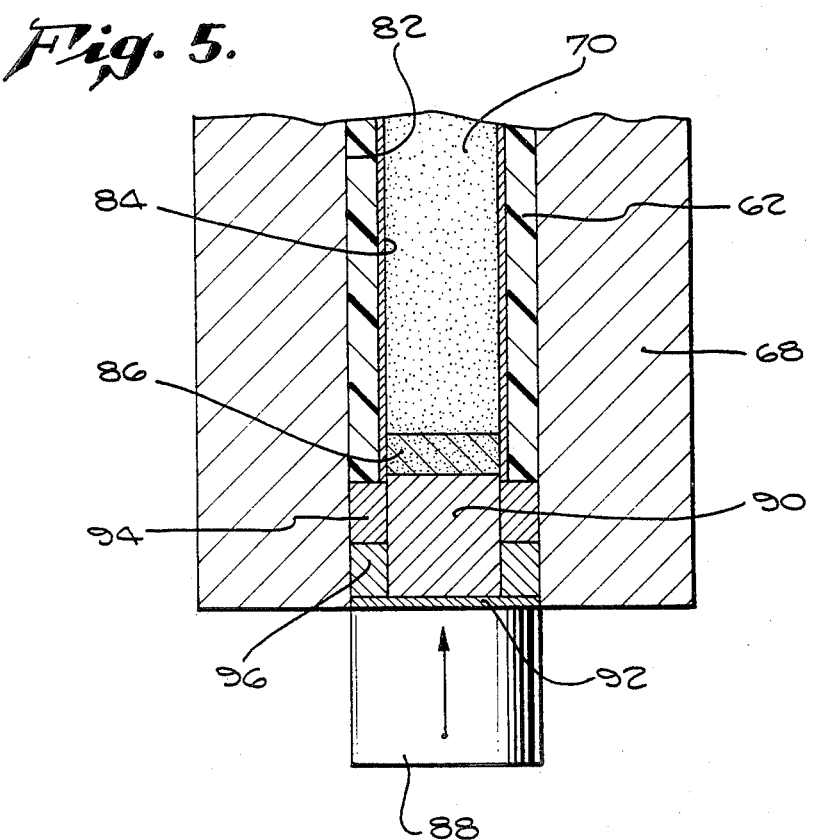

RELIABLE HIGH PRESSURE APPARATUS

FIELD OF THE INVENTION

The present invention relates to high pressure apparatus for making industrial diamonds or the like.

BACKGROUND OF THE INVENTION

It has previously been proposed to manufacture industrial diamonds using a high pressure cylindrical vessel which is provided with an insulating liner. One such arrangement is shown in U.S. Pat. No. 4,118,161. In the arrangements shown in this prior patent, the insulating liner is disclosed as stopping short of the end of the cylindrical high pressure chamber where the movable piston is located. The space between the end of the liner and the piston is disclosed as including driver material made up of zinc and/or lead. When the piston is advanced into the high pressure chamber, the driver material is disclosed as going into the end of the insulating liner, so that the liner is not deformed. In the prior patent, an end heater element is disclosed for increasing the temperature near the end of the charge adjacent the movable piston, to compensate for the additional cooling which occurs adjacent the piston. The end heater element is apertured. In practice, when a structure such as that described hereinabove is employed, the end heater tends to tilt, and a portion of the charge flows out into the space around the end heater, and some of the driver material comes in contact with the charge area. This undesired result tends to neutralize the effect of the heater, leading to non-uniform temperature, and reduces the available yield of industrial diamonds which normally should be produced by the heating and compression of the charge.

Accordingly, a principal object of the present invention is to increase the reliability and the yield of industrial diamonds or other products from very high pressure high temperature piston arrangements of the type described hereinabove.

SUMMARY OF THE INVENTION

In accordance with the present invention, a high pressure, high temperature apparatus of the type discussed hereinabove is provided with arrangements for stabilizing the movement of the end heater as the heating and compression cycle is initiated, and avoiding the presence of the zinc and lead extending from the inner edge of the insulating liner across the opening at the end of the liner. This desired result is accomplished more specifically by the use of a small supplemental piston of reduced diameter which is located immediately below the end heater, by the use of end heater material arrangements which extend to the space between the end of the insulating liner and the main piston, or through the use of additional charge material in the space beyond the end of the liner, to further increase the yield of the desired product.

In addition, the apparatus preferably includes a thin layer or washer of lead extending across or around the end face of the main piston, and a ring of zinc immediately adjacent the end of the insulating tube to prevent undesired flow of material within the high pressure vessel into the space between the inner cylindrical walls of the chamber per se, and the insulating liner.

When a supplemental charge is employed in the space between the end of the liner and the piston, the end heater may be modified, in configuration and/or resistance, for example, a supplemental outer end heater may be used, and the end heater may have an outer diameter greater than the inner diameter of the insulating liner. Also, an additional thin layer of non-conductive material, such as asbestos, may extend around the periphery of the additional charge, the heater, and/or the zinc ring.

In connection with the arrangement in which the end heater extends into the space below the liner, it may be of somewhat increased resistivity as compared with a normal small end heater, so that the total heat generated is substantially the same and is adequate to heat the adjacent outer end of the charge to the desired elevated temperature of the remainder of the charge.

In several embodiments, it is also advantageous to provide an additional lead washer or ring immediately adjacent and below the zinc ring.

The present new arrangements are more reliable than those which have previously been employed, in that the charge and the other materials are substantially confined to the desired zones within the high pressure chamber, greater stability of operation is achieved, uniform temperature is better maintained, and the rated quantities of industrial diamonds or other products which are being produced, are regularly obtained.

Other objects, features and advantages of the invention will become apparent from a consideration of the associated drawings and from the following detailed description.

BRIEF DESCRIPTION OF THE DRAWINGS

FIG. 4 is cross sectional view of a portion of a charge resulting from the arrangements of FIG. 3;

FIG. 5 illustrates the use of a supplemental piston in an apparatus of the type under consideration;

FIGS. 7 and 8 show the use of end heaters of somewhat different configurations, illustrating alternative embodiments of the invention.

DETAILED DESCRIPTION

Figure 1:
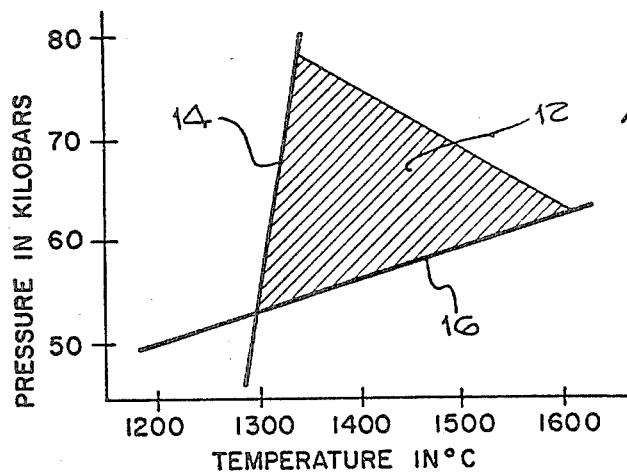
FIG. 1 is a plot of pressure versus temperature for the critical temperatures and pressures required for forming diamonds in a particular solution.

Many of the background facts relating to the manufacture of diamonds are well known at present, and a number of these facts are set forth in U.S. Pat. No. 3,704,969. FIG. 1 of the present drawings, which is similar to FIG. 1 of the above-identified patent, shows a region 12 bounded to the left and right by the lines 14 and 16 which represents a region in the pressure versus temperature field in which industrial diamonds may be formed. In FIG. 1, the line 16 represents a critical transition line for the element carbon with diamonds being the stable state for carbon above the line 16, and graphite being the stable state for carbon below line 16. Incidentally, the density of diamond is about 3.4, while the density of graphite is only about 2.23. Accordingly, in addition to raising the temperature and pressure to the shaded zone as indicated in FIG. 1, the charge from which the diamonds are being made is reduced substantially in volume as the transition from graphite to diamonds occurs.

In addition, in order to convert graphite to diamond, graphite must first be mixed with a suitable quantity of material which, when the material is in its liquid phase, is a good solvent for carbon. One such material is a nickel-iron alloy having 50% nickel and 50% iron. The line 14, which extends almost at right angles from line 16, is a phase boundary line, with the left hand side of the phase boundary line 14 representing the solid phase of the alloy, and the right hand side of line 14 representing the liquid phase. In practice, a charge including powdered graphite and powdered particles of the nickel iron alloy are heated and compressed to a point well within the shaded zone 12 as shown in FIG. 1. In this region the alloy is in its liquid phase, and the graphite goes into solution. If the temperature is held just above the line 16, as discussed in the above cited U.S. Pat. No. 3,704,969, diamonds begin to form and crystallize out, particularly if the charge is held at this point for a period of time. Then, by gradually cooling the melt, the state of the charge shifts to the left as shown in FIG. 1 and the charge solidifies. The diamonds are later extracted from the solidified mass by well known acid dissolving techniques.

Figure 2:
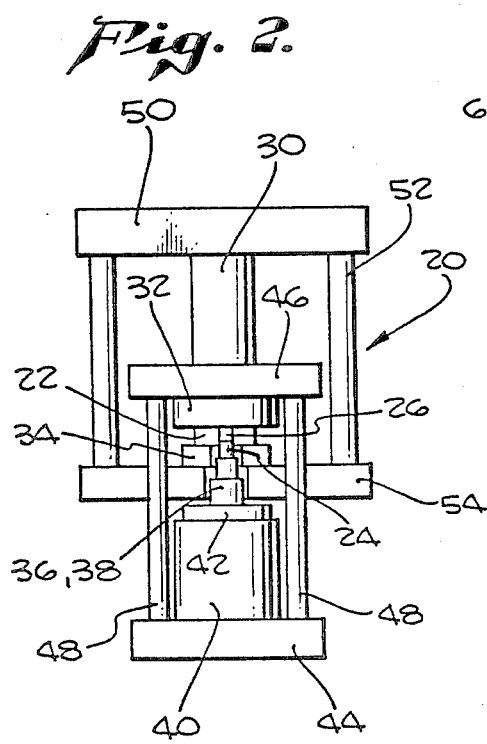
FIG. 2 is a schematic showing of a press which may be employed for making industrial diamonds.

FIG. 2 is a schematic representation of a high pressure apparatus 20 which may be used to convert graphite to diamond. High pressure apparatus of the general type shown in FIG. 2 is discussed by Kennedy and LaMori in an article entitled "Some Fixed Points On The High Pressure Scale" which appeared in "Progress in Very High Pressure Research", Bundy, Hibbard and Strong, ed., J. Wiley and Sons 1961, and in an article by Kennedy, Haygarth and Getting entitled "Determination of the Pressure of Barium I-II Transition With Single Stage Piston--Cylinder Apparatus" appearing in the Journal of Applied Physics, Volume 38, No. 12, pages 4557-4564, November 1967.

Returning now to FIG. 2 (which is not drawn to scale), toward the center of the figure is a composite pressure vessel 22 and piston 24. The composite pressure vessel 22 has a central pressure chamber 26 into which a charge is placed and into which the piston 24 is forced to properly compress the charge under suitable high temperature and pressure conditions. The piston 24, and the central portion of the composite member 22 are made of cemented tungsten carbide in view of the outstanding capability of this material to withstand very high pressure. However, its capability to withstand very high pressures is marginal in the vicinity of 50 kilobars and higher which is required for the fabrication of diamonds. Accordingly, the relatively complex high pressure apparatus of FIG. 2 is provided, with its two hydraulic cylinders 40 and 30 to supply high levels of supporting compression to both sides of the composite vessel 22 as the piston 24 is forced into the cylindrical chamber 26.

Now, in greater detail, the composite high pressure vessel 22, containing the central high pressure chamber 26, is bounded on its upper and lower ends by the upper end load plate 32, and the composite lower end load plate or structure 34, respectively. As mentioned above, these end load structures support the ends of the high pressure structure 22, particularly the central tungsten carbide portion, and prevent it from rupturing when it is under extreme pressure from the reaction chamber 26. In addition, the upper end load plate 32 serves to seal the top end of the reaction chamber 26.

The forces required to move piston 24 into reaction chamber 26, thereby generating the high pressure within reaction chamber 26, are applied to piston 24 through the piston pusher 36 and the piston pusher driver 38, as shown in FIG. 4. The forces are generated by the hydraulic ram 40 which moves the hydraulic piston 42. Structural members 44 and 46 are positioned above the end load plate 32, and below the hydraulic ram 40, and these are firmly secured together by the tying members 48 so that the force loop is closed.

As mentioned above, when extremely high pressures are generated in the reaction chamber 26, forces are created in the composite high pressure vessel 22 which might cause it to rupture at the ends of the high pressure chamber 26. In order to avoid this type of occurrence, a second hydraulic ram 30 is provided, having one end positioned above the structural member 46, and the other in engagement with the structural member 50, which together with the tying elements 52 and the lower end load platen 54, forms a second force loop. This second force loop engages the composite high pressure vessel 22 on both sides, through the end load plate 32 at the top, and through the composite end load plate structure 34 on the bottom. Accordingly, when the hydraulic ram 30 is actuated, high pressures are placed on both ends of the composite pressure vessel 22 to counteract the stresses generated internally when the piston 24 is advanced.

As mentioned above, the overall configuration of the pressure applying apparatus shown in FIG. 2 was described in U.S. Pat. No. 3,704,969.

Figure 3:
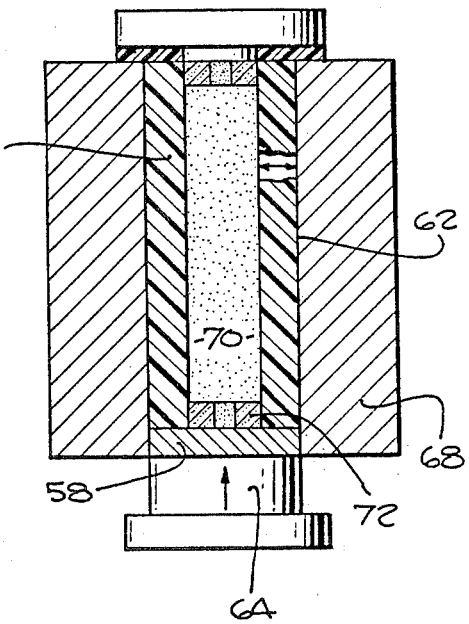
FIG. 3 shows a prior art arrangement for growing diamonds utilizing a special driver material to assist in the compression step.

FIG. 3 represents the prior art arrangement shown in U.S. Pat. No. 4,118,161, in which a zinc or lead or alloy plug 58 is employed at the lower end of the high pressure chamber 62 to make initial engagement with the face of the piston 64. In FIG. 3, the cylindrical insulating bushing 66 is shown lining the pressure chamber 62 within the composite high pressure vessel having a central tungsten carbide member 68. As the piston 64 moves upward, the zinc or lead or alloy element 58, which is relatively soft and ductile, flows into the lower end of the space 70 within the bushing 66, so that the piston 64 may advance by a distance at least equal to the thickness of the element 58 before any deformation of the bushing 66 occurs. Other details of the mode of operation of the prior art structure as shown in FIG. 3 are set forth in the above-identified U.S. Pat. No. 4,118,161.

As mentioned hereinabove, the arrangements as shown in U.S. Pat. Nos. 4,118,161 and 3,704,969, had certain shortcomings. More specifically, FIG. 4 is a schematic cross-sectional showing of a portion of a sample taken from a high pressure vessel, in which the arrangements of FIG. 3 were employed. In FIG. 4, one portion of the end of the insulating tube 66 is shown together with the end heater structure 72 which was tilted into the angular position shown in FIG. 4 in the course of a cycle of operation of the system. A portion of the stainless steel wall 74 which is normally employed to encompass the charge was still present attached to the fragment shown in FIG. 4. However, some of the charge 76 had flowed around the end heater structure 72 and made contact with the driver material 80 which included zinc and/or lead. This tilting of the end heater structure and the flow of charge past it is an undesired condition which upsets the operation of the end heater and reduces the yield of the process. Further, instability problems of the type indicated in FIG. 4 occur regularly when attempts are made to utilize the arrangements as shown in FIG. 3 in which zinc and/or lead extends from the inner edge of liner 66 and across the opening of the liner.

FIG. 5 shows one arrangement for avoiding the problems indicated in connection with FIG. 4. More specifically, in FIG. 5 the tungsten carbide vessel 68 has the central high pressure cavity 82 lined with the insulating sleeve 62. The central charge 70 may be enclosed by the thin stainless steel cylinder 84. A cylindrical end heater structure 86, which may be formed of a mixture of graphite and insulating material such as potassium bromide, or other material of suitable resistance, is located below the charge 70 and within or below the end of the liner 62. The piston structure in the apparatus of FIG. 5 includes both a main piston 88 which has a diameter substantially equal to or just barely less than the diameter of the high pressure cavity 82, and the smaller supplemental piston 90 having a diameter approximately equal to the inner diameter of the insulating sleeve 62 or that of the thin walled stainless steel charge enclosing cylinder 84. Immediately above the main piston 88 is a lead disc 92 which serves to seal the piston to the inner surfaces of the high pressure cavity 82 and prevent undesired loss of material and undesired friction along the piston. In addition, the zinc ring 94 and the lead ring or washer 96 are provided around the outside of the supplemental piston 90, to contain and control the flow of material and as a guide and as hydraulic material to cause the supplemental piston 90 to move in a controlled manner relative to the advance of the main piston 88.

In operation, as the main piston 88 is moved upward and electricity is supplied to heat the charge 70 to an elevated temperature, the end heater 86 and the supplemental piston 90 will move smoothly and uniformly upward and in a controlled manner (following well-known principles of hydraulics) relative to the main piston 88, in accordance with the reduction in volume in the charge 70 which occurs when the diamonds are formed.

Figure 6:
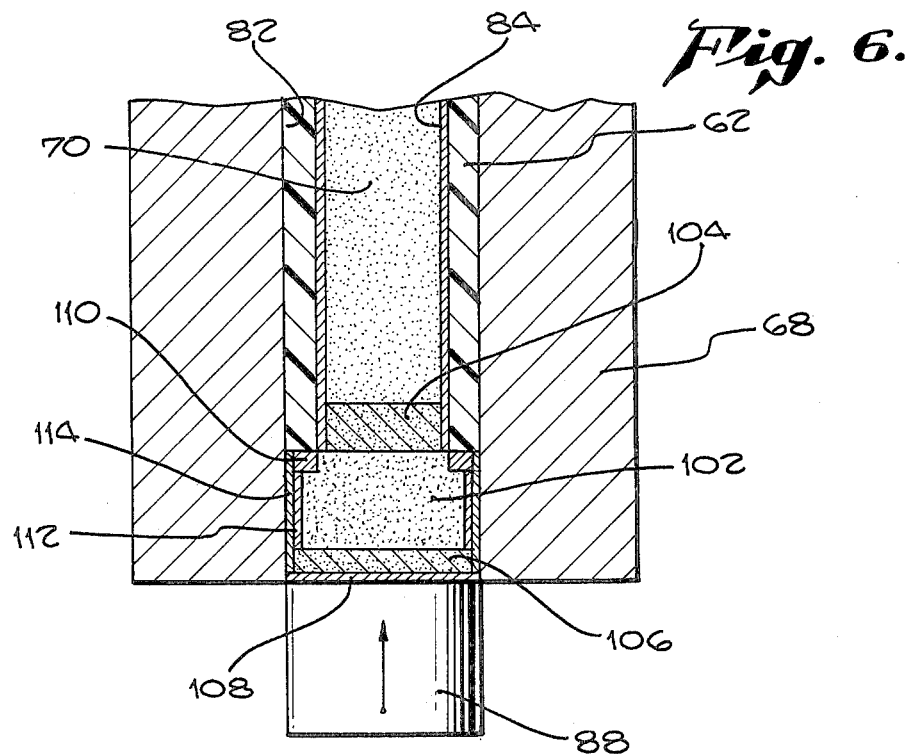
FIG. 6 shows the use of a supplemental charge located between the end of the main insulating liner and the piston.

FIG. 6 shows an alternate arrangement in which the space between the end of the insulating sleeve 62 and the top of the main piston 88 includes a supplemental charge 102 which is to be converted into industrial diamonds along with the main charge 70. In the implementation of the arrangement of FIG. 6, two end heaters are provided, first an inner end heater 104 and second, an outer end heater 106 located close to the piston 88, and separated from it only by the lead disc 108. As in the prior arrangements, a zinc ring 110 may be provided immediately adjacent the insulating liner 62 to preclude the flow of material between the liner 62 and the inner wall of the high pressure chamber 82. Enclosing and confining the supplemental charge 102 is the stainless steel tube 112; and an additional layer 114 of insulating material such as asbestos is provided between the charge and the inner walls of the high pressure cavity 82 to insulate the charge and permit the flow of electricity through charge 102 to heat it up. Normally, it is desirable to transmit all current through the supplemental charge 102 and the outer end heater 106. This may be accomplished by supplying current directly from the body number 68 to the lower piston 88 and the lead layer 108 to pass through the entire assembly. The composition of the end heaters 104 and 106 are adjusted to have a suitable resistance to provide the desired uniform heating in both the main charge 70 and in the supplemental charge 102.

The arrangement of FIG. 6 is particularly advantageous in that the total capacity of the unit is increased by the charge 102, and accordingly, greater quantities of industrial diamonds are produced. In some cases, the diamonds produced in the supplemental charge 102 may be slightly different from the diamonds formed in the main charge 70, because of the difficulty in maintaining the precise temperature conditions in charge 102 immediately adjacent the mouth of the cavity 82.

Figure 7:
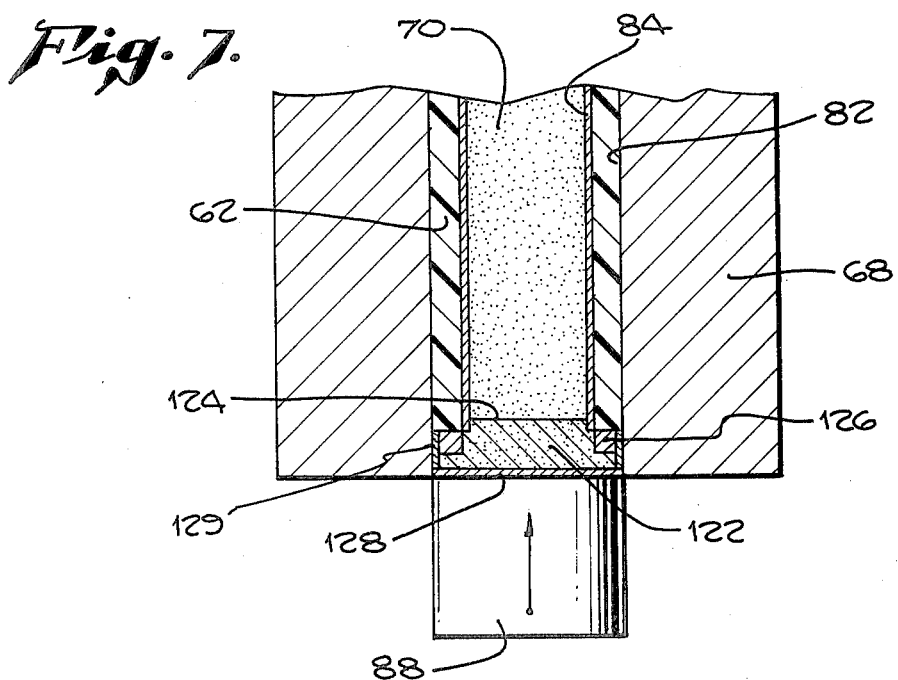

A third embodiment is shown in FIG. 7, in which an enlarged body of end heating material 122 is provided. Specifically, the end heating material 122 extends from the neighborhood of the lower end 124 of the charge and from the zinc sealing ring 126 down to the disc of lead 128 which immediately overlies the upper end of the piston 88. An outer insulating liner 129 (which may be asbestos) may be provided, serving the function described above in connection with the liner 114 of FIG. 6. With the arrangement as shown in FIG. 7, the amount of charge within the insulating liner 62 may be increased by lowering the plane 124 where the end heating material starts, as compared with the arrangement of FIG. 3, for example.

FIG. 8 shows another somewhat modified arrangement of the invention in which the charge 70 and its associated stainless steel lining 84 extends down to a point somewhat below the lower end of the insulating liner 62. The piston 88 is provided with a thin disc of lead 132 and a disc of zinc 134 overlying the lead disc. The end heater structure 136 is enclosed by a thin insulating layer 138, which may be of asbestos, to direct the heating current flow through the piston 88 and its associated lead and zinc discs 132 and 134 for flow through the entire end heater and charge assembly. Incidentally, the location of the surface 140 defining the boundary between the end heater 136 and the charge 70 may be as indicated, in which case the end heater configuration is recessed; or the surface could be above the lower end of the insulating liner 62, in which case the heater would have a slight protuberance, as shown in the embodiment of FIG. 7; or alternatively, the end heater structure 136 may be even with the end of the insulating liner 62.

Figure 9:
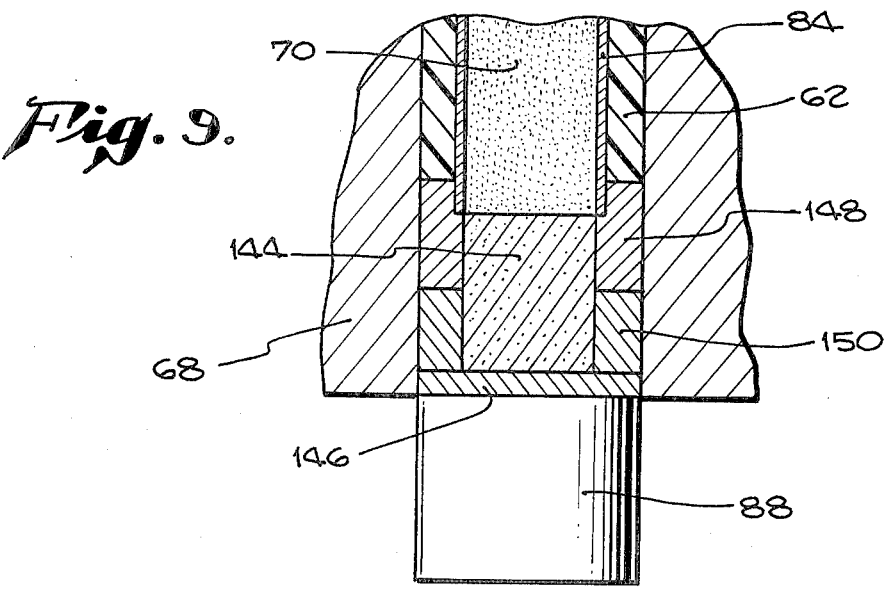
FIGS. 9 and 10 illustrate another embodiment of the invention.
Figure 10:
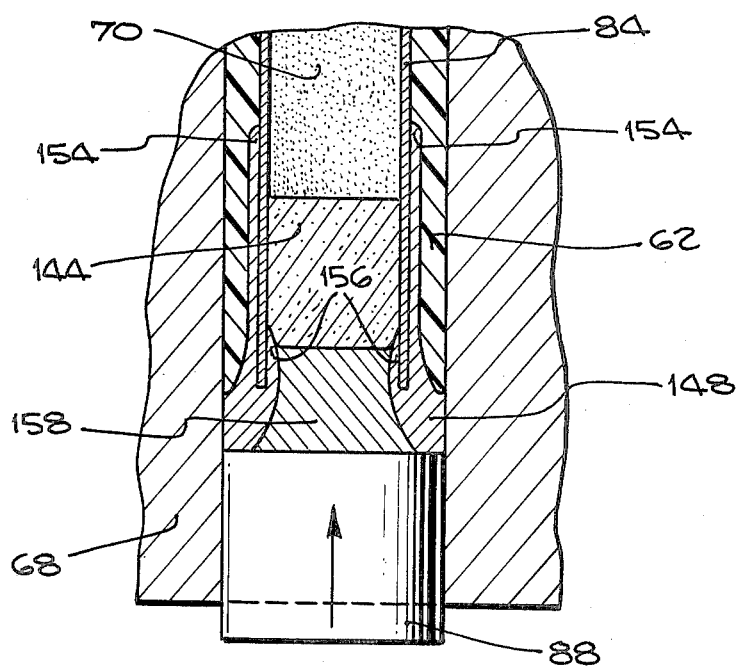

FIGS. 9 and 10 show another charge configuration, with FIG. 9 showing the initial arrangement, and FIG. 10 showing the arrangement following heating and advancing of the piston to form industrial diamonds. As in the other arrangements disclosed in this patent specification, instability is avoided by keeping the zinc and/or lead which forms the hydraulic fluid away from the space extending from the inner edge of the insulating liner across the opening of the liner.

As shown in FIG. 9, the initial configuration includes the extended end heater 144 extending from the lower end of the charge 70 to the lead sealing disc 146 which overlies the end of the tungsten carbide piston 88. The zinc ring 148 and the lead ring 150 are located close to the periphery of the high pressure chamber, and around the end heater 144.

Then the piston 88 is moved inward and the charge is heated electrically as discussed above. Following the formation of diamonds within the charge 70, which takes a substantial period of time, and cooling of the assembly, it has a cross-sectional configuration generally as shown in FIG. 10. The stabilizing sealing, and flow control action of the zinc material 148 is of particular interest. Note that a thin cylinder of zinc has extended up to point 154 between the stainless steel tube 84 and the insulating liner 62. Also, a thin layer of the zinc 148 has extended to point 156 within the stainless steel sleeve 84. With this action by the zinc ring, the end heater 144 moves smoothly into the end of the sleeve 84, with the lead material 158 from disc 146 and annulus 150 acting as sealing material and as hydraulic fluid in the stable controlled upward movement of end heater 144, in the course of change of state of the carbon included in charge 70.

For completeness, concerning prior arrangements of others, in addition to U.S. Pat. Nos. 3,704,969 and 4,118,161 referenced hereinabove, a related apparatus is shown in T. C. Poulter U.S. Pat. No. 2,554,499, granted May 29, 1951. In FIG. 4 of that prior patent, a high pressure arrangement is shown in which the space above an insulating sleeve is left open. On a preliminary basis, although this arrangement has some similarity to the presently proposed arrangements, the operation of the apparatus with the residual space may well be erratic, as compared with the reliable, controlled operation of the arrangements newly disclosed hereinabove. Concerning another minor point, although the plot of FIG. 1 relates to a fifty-fifty alloy of nickel and iron, it is preferred to use an alloy of about 40% nickel and about 60% iron, although other graphite solvents may be used, and this may be finely powdered and mixed with graphite to use as the "charge" in the various embodiments disclosed herein.

In closing, it is to be understood that the present invention is not limited to that as illustrated and described in detail hereinabove. Thus, by way of example, and not of limitation, various combinations of the structures shown in FIGS. 5, 6 and 7 may be employed; and alternative insulating and end heater compositions and arrangements may be employed. Also, although described in connection with the making of industrial diamonds, the present invention is also applicable to the implementation of other processes requiring high temperatures and pressures. Accordingly, as noted above, the present invention is not limited precisely to that shown and described herein.

What is claimed is:

1. An apparatus for obtaining high temperatures and pressures comprising:
a body of high temperature and high pressure resistant material having a cylindrical opening therein;
a liner of an insulating material extending along the wall of said opening but stopping short of one end thereof adopted to receive a charge of material to be electrically heated and compressed located at least in part within said liner;
piston means for compressing said charge, within the cylindrical opening in said body;
end heater means in the vicinity of the end of said opening for counteracting the increased cooling at the ends of said opening;
means including lead material in engagement with said piston means for sealing said cylindrical opening to said piston means as it advances;
means including an annular zinc element mounted at the end of said liner for preventing flow outside of said liner; and
means for initially mounting said charge, said end heater means, said zinc element and said lead material so that the space extending from the inner edge of said liner across the opening at the end of liner is substantially free of both zinc and lead, whereby smooth and stable compression occurs when said piston is advanced.

2. An apparatus as defined in claim 1 wherein said piston means includes a main piston having an outer diameter substantially equal to the diameter of said cylindrical opening in the body of high temperature and high pressure resistant material; and a supplemental piston mounted within said cylindrical opening, and having a diameter substantially equal to the inner diameter of said liner.

3. An apparatus as defined in claim 2 wherein means including hydraulic material such as lead is provided to control the advance of the supplemental piston as the main piston advances.

4. An apparatus as defined in claim 1 wherein said end heater extends from the vicinity of the end of said liner to close to the working face of said piston means.

5. An apparatus as defined in claim 1 wherein an inner end heater is located approximately at the end of said liner, an outer end heater is located adjacent said piston, a supplemental charge is mounted between said two end heaters, and means are provided for insulating the periphery of said supplemental charge from the inner walls of said body of high temperature and high pressure resistant material.

6. An apparatus as defined in claim 1 wherein said end heater is a solid element of resistive material having higher resistance than said charge.

7. An apparatus as defined in claim 6 wherein means are provided for insulating said resistive element and/or said zinc washer from the inner wall of said cylindrical opening.

8. An apparatus as defined in claim 1 wherein an additional annular element of lead is provided immediately adjacent said annular zinc element toward said piston means from said zinc element.

9. An apparatus as defined in claim 8 wherein said end heater means is initially located near said piston and is at least partially enclosed by at least one of said annular elements.

10. An apparatus as defined in claim 9 wherein said sealing means is a lead disc overlying the end of said piston, wherein said heater means is encircled by said annular element of lead, and wherein said charge initially extends below the end of said liner so that it is partially enclosed by one of said annular elements.

11. An apparatus for obtaining high temperatures and very high pressures comprising:
a body of high temperature and high pressure resistant material having a cylindrical opening therein;
a liner of an insulating material extending along the wall of said opening but stopping short of one end thereof adopted to receive a charge of material to be electrically heated and compressed located within said liner;
a supplemental rigid piston having an outer diameter approximately equal to the inner diameter of said liner extending into the end of said liner;
main piston means mounted near the mouth of said cylindrical opening for applying force to said supplemental piston;
means including lead in engagement with the end of said main piston for sealing said cylindrical opening to said main piston as said main piston advances; and means including material capable of hydraulic flow located between the end of said liner and the end of said cylindrical opening around said supplemental piston for insuring even and controlled movement of said supplemental piston into the end of said liner to compress said charge as said main piston is advanced.

12. An apparatus as defined in claim 11 wherein a ring of zinc material is located adjacent the end of said insulating liner.

13. An apparatus for obtaining high temperatures and very high pressures comprising:
- a body of high temperature and high pressure resistant material having a cylindrical opening therein;
- an insulating liner extending along the wall of said opening but stopping short of one end thereof adopted to receive a charge of material to be electrically heated and compressed located at least in part within said liner;
- piston means for compressing said charge, within the cylindrical opening in said body;
- end heater means in the vicinity of the end of said opening for counteracting the increased cooling at the ends of said opening;
- means in engagement with said piston means for sealing said cylindrical opening to said piston means as it advances;
- means including a ring of conductive sealing material mounted at the end of said liner for preventing flow outside of said liner; and
- means for initially mounting said charge, and said end heater means so that the charge or the end heating means initially extends from the inner edge of said liner across the end of the liner in the space immediately toward the piston means from the liner.

14. An apparatus as defined in claim 13 wherein means including hydraulic material such as lead is provided to control and stabilize the compression of the charge as the piston means advances.

15. An apparatus as defined in claim 13 wherein said end heater extends from the vicinity of the end of said liner to close to the working face of said piston means adjacent the mouth of said opening.

16. An apparatus as defined in claim 13 wherein an inner end heater is located approximately at the end of said liner, an outer end heater is located adjacent said piston means near the mouth of said opening, a supplemental charge is mounted between said two end heaters, and means are provided for insulating the periphery of said supplemental charge and/or said ring of sealing material mounted at the end of said liner from the walls of said cylindrical opening.

* * * * *

UNITED STATES PATENT AND TRADEMARK OFFICE
CERTIFICATE OF CORRECTION

PATENT NO. : 4,225,300
DATED : Sept. 30, 1980
INVENTOR(S) : Richard Latter

It is certified that error appears in the above-identified patent and that said Letters Patent are hereby corrected as shown below:

In claim 11, line 56, delete "adopted" and substitute - - adapted - -.

In claim 13, line 20, delete "adopted" and substitute - - adapted - -.

Signed and Sealed this

Ninth Day of December 1980

[SEAL]

*Attest:*

SIDNEY A. DIAMOND

*Attesting Officer*     *Commissioner of Patents and Trademarks*